Aug. 15, 1939.   W. B. SMITH   2,169,541
PRIMING DEVICE
Filed Nov. 26, 1937
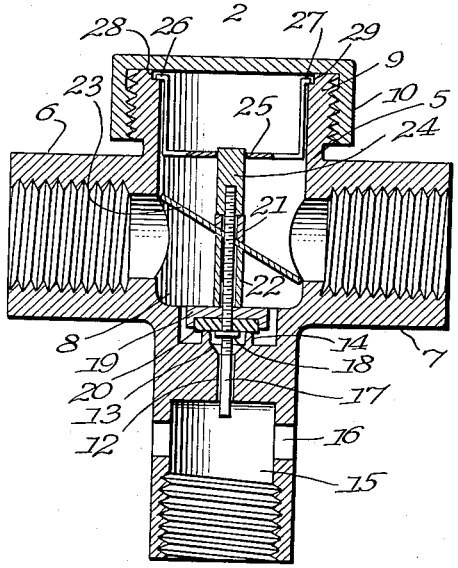
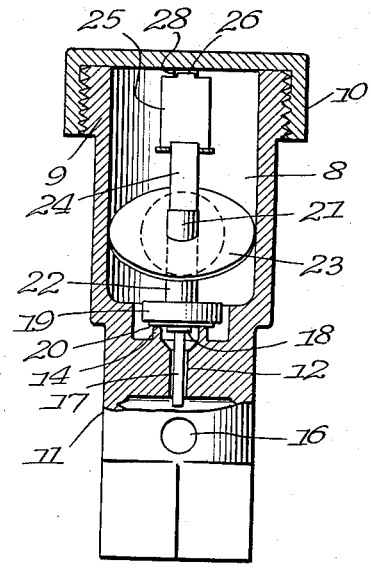
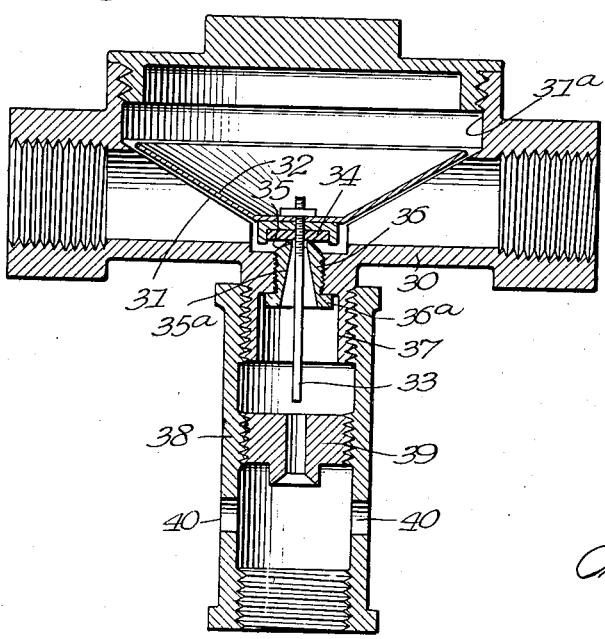
Inventor
William B. Smith Patented Aug. 15, 1939

2,169,541

UNITED STATES PATENT OFFICE 2,169,541

PRIMING DEVICE

William B. Smith, Washington, D. C.

Application November 26, 1937, Serial No. 176,762

12 Claims. (Cl. 182—12)

This invention relates to flow controlled devices wherein flow affects a valved outlet controlling flow to a branch off of the main flow passage. The device of the invention is particularly adapted to use as a drain trap primer although not confined to such application. An object of the invention is to provide a device of the character mentioned which is very efficient in operation and yet comprises a very small number of simple parts so as to be capable of most economical manufacture. As illustrative of the invention I have shown, by way of example, two practical embodiments thereof in the accompanying drawing with reference to which I shall particularly describe the invention. In the drawing, Figure 1 is an axial section of one embodiment of the invention;

Figure 2 is a partial section substantially on the line 2—2 of Figure 1,

Figure 3 shows in perspective a guide member appearing also in Figures 1 and 2; and Figure 4 is an axial section of another embodiment of the invention.

Referring first to Figures 1 to 3, reference numeral 5 designates generally a body with coaxial tubular extensions 6 and 7 which communicate with a cylindrical bore or cavity 8 having an axis intersecting the axis of the extensions at right angles. As here shown the extensions are interiorly threaded so as to be readily connectible in a fluid supply line, as to a faucet. The cavity 8 is extended into a neck 9 which is externally threaded for engagement by a closure cap 10. Diametrically opposite the neck 9 is a body extension 11 provided with a relatively small central bore 12 flared at 13 to a concentric annular upstanding rib 14 whose extremity is preferably rounded, as shown. Beyond the bore 12, extension 11 has an enlarged bore 15 whose extremity may be interiorly threaded, as shown, for connection with a line leading to a drain trap or the like. The walls of bore 15 are desirably provided with one or more vent openings as at 16 in order to prevent siphon action.

A spindle 17, one end of which is receivable in bore 12 in spaced relation to the walls of the latter, is threaded at its other end and engaged by a nut 18 and a threaded cuplike member 19 between which is interposed a compressible washer or gasket 20.

Superposed on member 19 and surrounding the stem 17 are tubular portions 21 and 22 whose adjacent edges are on a similar bias and engage a disk 23 which is of elliptical shape so as to substantially fill cross-sectionally the cylindrical bore 8. The tubular portions 21 and 22 are held against the disk 23 by means of a cap piece 24 threaded on the extremity of stem 17, the cap piece being of non-round cross section and engaged in a mating opening in a stirrup member 25 whose outturned upper extremities 26 and 27 are engaged in outwardly open recesses 28 and 29 formed in the interior of neck 9, the stirrup being held in place by means of the overlying top of cap 10.

The oblique arrangement of disc 23 is preferably such that its upper edge is at substantially the top of the bore of tubular member 6, here considered to be the inlet port, when gasket 20 rests on seat 14 in the manner shown in Figures 1 and 2. The disc cannot turn on the axis of stem 17 since it and the stem are restrained by reason of the engagement of the non-round cap member 24 in the mating opening in stirrup 25. The opening in the stirrup may be rectangular as shown in Figure 3. The stem 17 and associated parts are freely reciprocable, normally taking the position in Figures 1 and 2 and returning to that position under the influence of gravity when displaced therefrom.

It will be evident that flow to the right, Figure 1, impinging against the oblique lower surface of the disc 23, will bodily lift the latter and therewith the stem 17 and gasket 20 so that flow will occur through bores 12 and 15 and so to the drain trap or other device to be primed. There is preferably sufficient clearance between the disc and the walls of bore 8 so that there will be no lifting of washer 20 as the result of slight flow caused by a leaky washer. At the same time disc 23 serves as a centering guide, in conjunction with the stirrup 25, for the stem 17, so that the latter will always keep a susbtantially axial position relative to bore 12, thus insuring proper seating of the washer 20 on the seat 14.

It will be apparent that the stem 17 and appurtenant parts may be turned 180 degrees from the position shown in Figure 1 so that extension 7 may be the inlet side of the device.

The arrangement shown in Figure 4 is generally the same as that just described. The main differences are that the body 30 is provided with a conical cavity 31 whose axis intersects the axis of the flow passage and that instead of a disc a conical member 32, secured to the valve stem 33, is provided. The valve stem 33, as above, carries a valve gasket or disc 34 which cooperates with the conical upper upstanding extremity or rib 35 of a hollow plug 36 as a seat. The plug has a downwardly flared conical interior 35ᵃ which enables any foreign matter to escape readily. The seat 35 quite closely surrounds the valve stem, the clearance being only sufficient to permit an adequate flow when the gasket 34 lifts. There is a preferably substantially line contact between the gasket and seat, as shown. There is no retaining nut below the gasket and the latter is held in place through screw engagement with the stem or it may be cemented in the superjacent cup member.

Threaded on the body extension 37 is a tubular coupling member 38 provided with an axially pierced and threaded-in plug 39 and one or more vent openings as at 40. The conical cavity 31 is surmounted by a cylindrical portion 31ᵃ into which the conical member 32 may rise to unseat the valve disc when influenced by flow in either direction through the flow passage. When flow is interrupted the conical member naturally gravitates to a centered position so that gasket 34 seats properly. It will be seen that reciprocation of member 32 may take place freely since its diameter is substantially less than the diameter of the cylindrical cavity portion 31ᵃ.

In each embodiment it is intended that valve return shall be effected by gravity. With the valve body so mounted that gravity return is impossible or uncertain, spring return means must be provided.

While I have shown and described two embodiments of the invention by way of example, it will be understood that I do not limit myself to details of form and arrangement except as in the following claims.

I claim:

1. A device of the class described comprising a body having a flow passage therethrough and an outlet communicating with said passage, a valve member for controlling said outlet, and means for actuating said valve member comprising a bodily reciprocable member connected to the latter and having an impingement surface oblique to the line of flow through said passage and to the line of reciprocation of said reciprocable member.

2. A device according to claim 1 wherein the reciprocable member is in the form of a disc.

3. A device according to claim 1 wherein the reciprocable member is constituted by a disc, and wherein guide means is provided for holding the disc against rotation, the disc being adjustable relative to said guide means so as to be operatively affected by flow through said passage in either direction.

4. A device according to claim 1 wherein the reciprocable member is in the form of a cone.

5. A device of the class described comprising a body having a flow passage therethrough, a cavity intersecting said passage and an outlet at one end of said cavity, a valve member for controlling said outlet, a reciprocable stem on which said valve member is fixed, and an actuating member fixed on said stem and disposed in said cavity, said actuating member having an impingement surface oblique to the line of flow through said passage and to the line of reciprocation of said stem.

6. A device according to claim 5 wherein the actuating member is constituted by a disc, and wherein guide means is provided for holding the disc against rotation.

7. A device according to claim 5 wherein the actuating member is constituted by a disc, and wherein guide means is provided for holding the disc against rotation, the disc being adjustable relative to said guide means so as to be operatively affected by flow through said passage in either direction.

8. A device according to claim 5 wherein the actuating member is in the form of a cone operatively affected by flow through said passage in either direction.

9. A device of the class described comprising a body having a flow passage therethrough and an outlet communicating with said passage, said outlet being defined adjacent the passage by an annular upstanding rib and being outwardly flared beyond the latter, a valve disc co-operable with said rib as a seat, and means operated upon flow through said passage to unseat said disc.

10. A device of the class described comprising a body having a flow passage therethrough and an outlet communicating with said passage, a valve member for controlling said outlet, a reciprocable stem on which said valve member is fixed, an actuating member fixed on said stem and having an impingement surface in the flow passage, said surface being oblique to the line of flow through said passage and to the line of reciprocation of said stem, said stem having a non-round portion, and a fixed guide member having an opening mating with said non-round portion whereby to prevent rotation of said stem.

11. A device according to claim 10 wherein the stem comprises two tubular portions having complementarily inclined adjacent ends between which the actuating member is clamped.

12. A device according to claim 10 wherein the body includes a cap portion which retains the guide member in place.

WILLIAM B. SMITH.